United States Patent
Gebhardt et al.

(10) Patent No.: US 12,474,213 B2
(45) Date of Patent: Nov. 18, 2025

(54) SYSTEM FOR MONITORING A SWITCHGEAR

(71) Applicant: ABB Schweiz AG, Baden (CH)

(72) Inventors: Joerg Gebhardt, Mainz (DE); Stephan Wildermuth, Laudenbach (DE); Ralf Gitzel, Mannheim (DE); Kai Koenig, Walldorf (DE); Joerg Ostrowski, Zürich (CH); Patrik Reto Kaufmann, Baden (CH); Boguslaw Samul, Cracow (PL)

(73) Assignee: ABB Schweiz AG, Baden (CH)

( * ) Notice: Subject to any disclaimer, the term of this patent is extended or adjusted under 35 U.S.C. 154(b) by 634 days.

(21) Appl. No.: 17/871,064

(22) Filed: Jul. 22, 2022

(65) Prior Publication Data
US 2022/0357206 A1    Nov. 10, 2022

Related U.S. Application Data (63) Continuation of application No. PCT/EP2021/051600, filed on Jan. 25, 2021.

(30) Foreign Application Priority Data

Jan. 29, 2020    (EP) .................... 20154321

(51) Int. Cl.
*G01J 5/00* (2022.01)
*G01R 31/327* (2006.01)
(Continued)

(52) U.S. Cl.
CPC ........ *G01J 5/0096* (2013.01); *G01R 31/3275* (2013.01); *G06T 7/0002* (2013.01);
(Continued)

(58) Field of Classification Search
CPC ........... G01J 5/0096; G01J 2005/0077; H04N 23/90; G01R 31/3275; G06T 7/0002; G06T 2207/10048; G06T 2207/30232
See application file for complete search history.

(56) References Cited

U.S. PATENT DOCUMENTS

| | | | |
|---|---|---|---|
| 5,637,871 A * | 6/1997 | Piety ......................... | G01J 5/48 |
| | | | 250/358.1 |
| 9,706,137 B2 * | 7/2017 | Scanlon .................. | H04N 23/23 |

(Continued)

FOREIGN PATENT DOCUMENTS

| | | | | |
|---|---|---|---|---|
| AU | 2010100428 A4 | 7/2010 | | |
| AU | 2012329598 A1 * | 6/2014 | ............. | G01K 1/024 |

(Continued)

OTHER PUBLICATIONS

U.S. Appl. No. 17/871,064, filed Jan. 30, 2025_AU_2012329598_A1_H.pdf,Jun. 19, 2014.*

(Continued)

*Primary Examiner* — Peter J Macchiarolo
(74) *Attorney, Agent, or Firm* — Leydig, Voit & Mayer, Ltd.

(57) ABSTRACT

A system for monitoring a switchgear includes multiple infrared cameras with fields of view; a processing unit; and an output unit. The cameras acquire multiple image data of a plurality of phases of the switchgear, and the processing unit determines whether there is a phase imbalance in a specific phase comprising a determination from a plurality of image data that temperature information for a plurality of component parts and/or a plurality of connections for that specific phase has an overall enhanced temperature compared to the temperature information for the same plurality of component parts and/or the same plurality of connections for one or more other phases of the plurality of phases. The (Continued)

output unit is configured to output information that a fault or load imbalance has occurred in a phase.

14 Claims, 3 Drawing Sheets

(51) Int. Cl.
*G06T 7/00* (2017.01)
*H04N 23/90* (2023.01)

(52) U.S. Cl.
CPC ...... *H04N 23/90* (2023.01); *G01J 2005/0077* (2013.01); *G06T 2207/10048* (2013.01); *G06T 2207/30232* (2013.01)

(56) References Cited

U.S. PATENT DOCUMENTS

| | | | | |
|---|---|---|---|---|
| 2006/0049350 | A1* | 3/2006 | Teich | H04N 5/33 348/E7.086 |
| 2023/0014691 | A1* | 1/2023 | Ostrowski | G01J 5/0066 |
| 2023/0026139 | A1* | 1/2023 | Ostrowski | G01K 7/427 |

FOREIGN PATENT DOCUMENTS

| | | | | | |
|---|---|---|---|---|---|
| CA | 2695727 | A1 | * | 9/2010 | ............ H01H 83/04 |
| CN | 101183130 | A | | 5/2008 | |
| CN | 109000803 | A | * | 12/2018 | |
| CN | 110726886 | A | | 1/2020 | |
| DE | 102005007227 | A1 | | 8/2006 | |
| EP | 2827581 | A2 | * | 1/2015 | ............ H04N 23/631 |
| EP | 3171469 | A1 | * | 5/2017 | ............ G01K 13/00 |
| EP | 3598090 | A1 | | 1/2020 | |
| JP | 56-40726 | A | | 4/1981 | |
| JP | H0236724 | A | * | 2/1990 | |
| JP | 7-245832 | A | | 9/1995 | |
| KR | 10-1573806 | B1 | | 12/2015 | |
| WO | WO-2014043592 | A2 | * | 3/2014 | ............ G01J 5/025 |

OTHER PUBLICATIONS

U.S. Appl. No. 17/871,064, filed Jan. 30, 2025_CA_2695727_A1_H.pdf,Sep. 5, 2010.*
U.S. Appl. No. 17/871,064, filed Jan. 30, 2025_CN_109000803_A_H.pdf,Dec. 14, 2018.*
U.S. Appl. No. 17/871,064, filed Jan. 30, 2025_EP_2827581_A2_H.pdf,Jan. 21, 2015.*
U.S. Appl. No. 17/871,064, filed Jan. 30, 2025_EP_3171469_A1_H.pdf,May 24, 2017.*
U.S. Appl. No. 17/871,064, filed Jan. 30, 2025_WO_2014043592_A2_H.pdf,Mar. 20, 2014.*
U.S. Appl. No. 17/871,064, filed Jan. 30, 2025_JP_H0236724_A_H.pdf,Feb. 6, 1990.*
U.S. Appl. No. 17/871,064, filed Jan. 30, 2025_KR_1694349_B1_H.pdf,Jan. 13, 2017.*
European Patent Office, Extended European Search Report in European Application No. 20154321.2, 9 pp. (Jul. 6, 2020).
European Patent Office, International Search Report in International Patent Application No. PCT/ EP2021/051600, 3 pp. (Apr. 8, 2021).
European Patent Office, Written Opinion in International Patent Application No. PCT/EP2021/051600, 9 pp. (Apr. 8, 2021).
Kuan et al., "Adaptive thermo-fluid moving boundary computations for interfacial dynamics," *Acta Mechanica Sinica*, 28(4): 999-1021 (Aug. 15, 2012).
The Patent Office of the People's Republic of China, Office Action in Chinese Patent Application No. 202180010609.5, 10 pp. (Jan. 22, 2025).
Balgard et al., "Monitoring primary circuit temperatures and breaker condition in MV substations," *ABB Review*, No. 3, 21-26 (Jan. 1993).
Wildermuth et al.,"Infrared temperature sensing in electrical equipment by low-cost IR cameras," *VDE High Voltage Technology 2018, ETG-Symposium*, 200-204 (Nov. 12-14, 2018).
European Patent Office, Office Action in European Patent Application No. 21700798.8, 6 pp. (Mar. 20, 2025).

* cited by examiner

Switchgear Cabinet structure - schematic side view
with several cameras observing the phase and possibly its junctions

Fig. 4

SYSTEM FOR MONITORING A SWITCHGEAR

CROSS-REFERENCE TO RELATED APPLICATIONS

This patent application claims priority to International Patent Application No. PCT/EP2021/051600, filed on Jan. 25, 2021, and to European patent application no. EP20154321.2, filed on Jan. 29, 2020, both of which are incorporated by reference.

FIELD OF THE DISCLOSURE

This relates to systems for monitoring a switchgear.

BACKGROUND OF THE INVENTION

When monitoring busbars in a three-phase electrical equipment (e.g. Medium Voltage MV switchgear) using infrared camera images, one possible approach to detect a certain class of fault (e.g. loose screws or other poor contacts or failure of a part or connection) is to compare heat generated between different conductors. Conductors of a phase with a heat generating fault will appear hotter than the conductors for the other phases. As metallic busbars are good heat conductors, the elevated temperature may spread along a busbar over a certain distance from the fault location. Thus, the whole area of the affected busbar, visible on an observing IR camera, may show up as a significantly elevated temperature compared to other busbars. If the typical small and very hot spot at the actual fault location is hidden, e.g. behind a cover or a different section of busbar (from the affected phase or a different phase), this fault may appear like a generally elevated temperature of one phase compared to another phase. This could then appear to be a load imbalance, where more current is flowing through that phase.

In the situation where there is a fault, maintenance of the switchgear is required.

However, in the situation where there is load imbalance, which is the case in which one phase is loaded with more power being consumed than the other phases, which leads to higher current through the conductors of this phase compared to the other phases, and correspondingly also to a higher temperature for this conductor, immediate maintenance is not required. While the load imbalance case does not require immediate remedial action such as maintenance it is not ideal, and a better distribution of loads over the phases would be favorable, and as such the operator does still need to know that this has occurred.

Therefore, in summary there are two cases that can produce similar images on an IR camera monitoring a busbar compartment, of which only one requires switchgear maintenance, but where the operator of the switchgear needs to know that either of them is occurring and whether it is a fault or a load imbalance.

BRIEF SUMMARY OF THE INVENTION

Therefore, it would be advantageous to have an improved system for monitoring a switchgear where a fault or load imbalance can be detected in a phase and a fault can be differentiated from a load imbalance.

In an aspect, there is provided a system for monitoring a switchgear, the system comprising: multiple infrared cameras with fields of view; a processing unit; and an output unit;

The multiple infrared cameras are configured to acquire multiple image data of a plurality of phases of the switchgear, wherein each phase comprises a plurality of component parts comprising a circuit breaker and a plurality of busbars and/or cables and wherein each phase comprises a plurality of connections between the plurality of components.

The at least one infrared camera of the multiple infrared cameras is configured to acquire image data of a same component part of the plurality of component parts of the plurality of phases and/or acquire image data of a same connection of the plurality of connections of the plurality of phases, and wherein each infrared camera acquires different image data to the other infrared cameras of the multiple infrared cameras.

The processing unit is configured to determine that there is a phase imbalance in a specific phase comprising a determination from a plurality of image data that temperature information for a plurality of component parts and/or a plurality of connections for that specific phase has an overall enhanced temperature compared to the temperature information for the same plurality of component parts and/or the same plurality of connections for one or more other phases of the plurality of phases.

The processing unit is configured to determine that there is a fault in a specific phase comprising a determination from a plurality of image data that temperature information for a first component part and/or a first connection for that specific phase has an enhanced temperature compared to the temperature information for the same first component part and/or the same first connection for one or more other phases of the plurality of phases and that temperature information for one or more second component parts and/or one or more second connections for that specific phase does not have an enhanced temperature compared to the temperature information for the same one or more second component parts and/or the same one or more second connections for one or more other phases of the plurality of phases.

The output unit is configured to output information that a fault or load imbalance has occurred in a phase.

BRIEF DESCRIPTION OF THE SEVERAL VIEWS OF THE DRAWING(S)

Exemplary embodiments will be described in the following with reference to the following drawings.

DETAILED DESCRIPTION OF THE INVENTION

Figure 1:
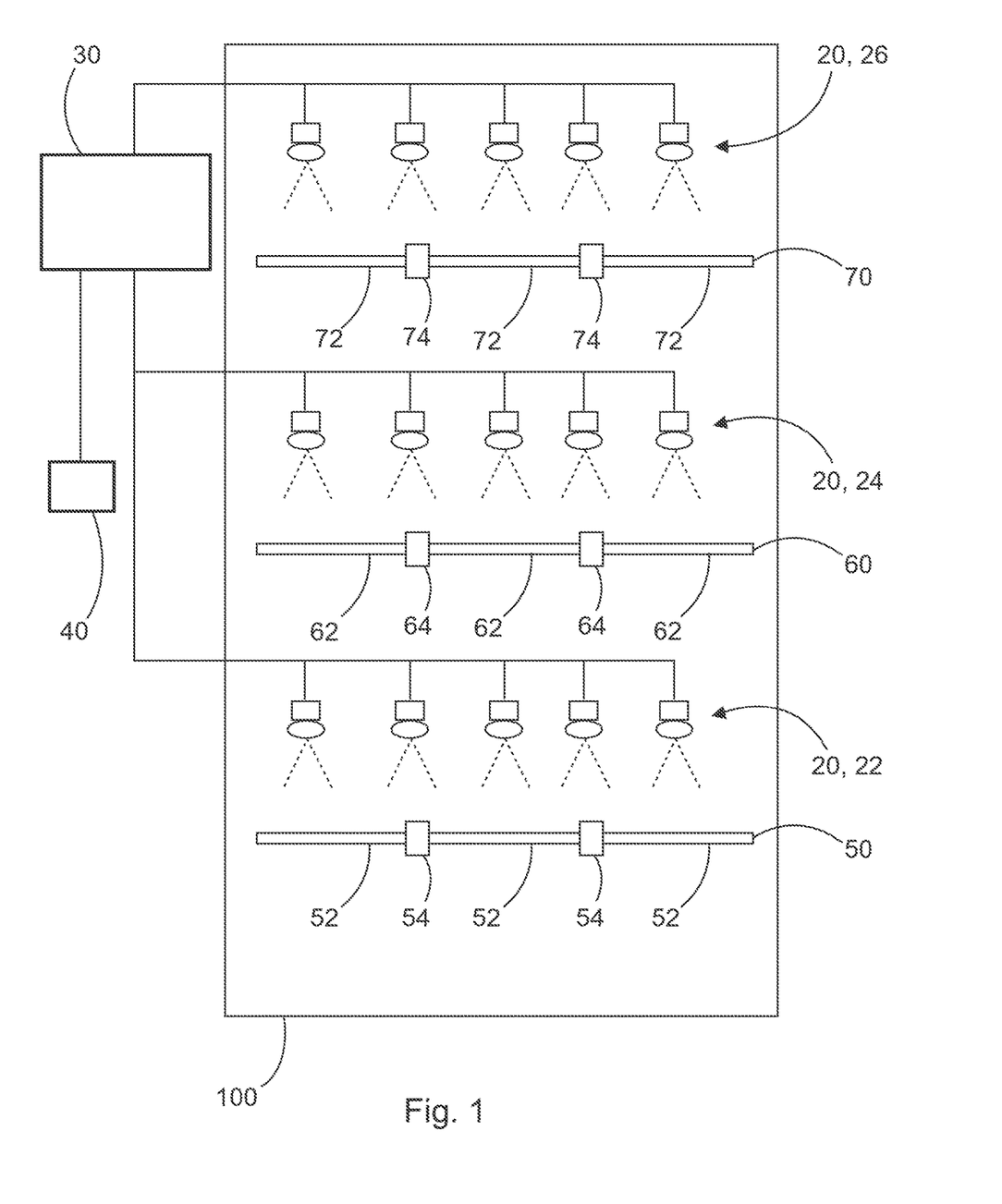
FIG. 1 shows a schematic representation of an example of a system for monitoring a switchgear installed within a switchgear in accordance with the disclosure.

FIG. 1 relates to a system for monitoring a switchgear. The system is shown installed within a switchgear in FIG. 1, however the system can be retrofitted to a switchgear and can be removed from a switchgear and re-fitted to another switchgear if necessary.

According to an example, the system comprises multiple infrared cameras 20, a processing unit 30, and an output unit

40. A first plurality of infrared cameras 22 is configured to acquired image data for a first phase 50 of a switchgear. The first phase comprises a plurality of component parts 52 comprising a circuit breaker and a plurality of busbars and the first phase comprises a plurality of connections 54 between the plurality of components. Each infrared camera of the first plurality of infrared cameras is configured to acquire image data for a component part of the plurality of component parts or a connection of the plurality of connections. Each infrared camera of the first plurality of infrared cameras acquires different image data to the other infrared cameras of the first plurality of infrared cameras. The processing unit is configured to indicate that a fault or load imbalance has occurred in the first phase. The indication comprises a determination that a temperature associated with image data acquired by a particular infrared camera of the first plurality of infrared cameras is associated with a fault or load imbalance in the first phase. The determination comprises utilization of one or more temperatures associated with image data acquired by one or more other infrared cameras of the first plurality of infrared cameras. The output unit is configured to output information that a fault or load imbalance has occurred in the first phase.

According to an example, the output unit is configured to output information that a fault has occurred in the first phase with respect to the component part or connection imaged by the particular infrared camera of the first plurality of infrared cameras.

According to an example, the determination that the temperature associated with the image data acquired by the particular infrared camera of the first plurality of infrared cameras is associated with a fault comprises a determination that the temperature associated with the image data acquired by the particular infrared camera is greater than an expected temperature. The expected temperature is determined comprising utilization of the one or more temperatures associated with the image data acquired by the one or more other infrared cameras of the first plurality of infrared cameras.

According to an example, a second plurality of infrared cameras 24 is configured to acquired image data for a second phase 60 of the switchgear. The second phase comprises a plurality of component parts 62 comprising a circuit breaker and a plurality of busbars and the second phase comprises a plurality of connections 64 between the plurality of components. Each infrared camera of the second plurality of infrared cameras is configured to acquire image data for a component part of the plurality of component parts or a connection of the plurality of connections of the second phase. Each infrared camera of the second plurality of infrared cameras acquires different image data to the other infrared cameras of the second plurality of infrared cameras. The determination that the temperature associated with the image data acquired by the particular infrared camera of the first plurality of infrared cameras is associated with a fault or load imbalance comprises utilization of a temperature associated with image data acquired by an infrared camera of the second plurality of infrared cameras for the same component part or connection of the second phase to the component part or connection of the first phase imaged by the particular infrared camera of the first plurality of infrared cameras.

According to an example, the determination that the temperature associated with the image data acquired by the particular infrared camera of the first plurality of infrared cameras is associated with a fault or load imbalance comprises utilization of one or more temperatures associated with image data acquired by one or more other infrared cameras of the second plurality of infrared cameras for the same one or more components and/or one or more connections of the second phase to the one or more components and/or one or more connections of the first phase imaged by the one or more other infrared cameras of the first plurality of infrared cameras.

According to an example, the processing unit is configured to determine that a fault has occurred in the first phase with respect to the component part or connection imaged by the particular infrared camera of the first plurality of infrared cameras when the temperature associated with the image data acquired by the particular infrared camera of the first plurality of infrared cameras is greater than the temperature data associated with image data acquired by the infrared camera of the second plurality of infrared cameras for the same component part or connection of the second phase to the component part or connection of the first phase imaged by the particular infrared camera of the first plurality of infrared cameras. The processing unit is configured specifically determine that a fault has occurred when a temperature profile between the temperature associated with the image data acquired by the particular infrared camera of the first plurality of infrared cameras and the one or more temperatures associated with image data acquired by one or more other infrared cameras of the first plurality of infrared cameras is substantially different to a temperature profile between the temperature data associated with the image data acquired by the infrared camera of the second plurality of infrared cameras for the same component part or connection of the second phase to the component part or connection of the first phase imaged by the particular infrared camera of the first plurality of infrared cameras and the one or more temperatures associated with the image data acquired by the one or more other infrared cameras of the second plurality of infrared cameras for the same one or more components and/or one or more connections of the second phase to the one or more components and/or one or more connections of the first phase imaged by the one or more other infrared cameras of the first plurality of infrared cameras.

According to an example, the processing unit is configured to determine that a load imbalance has occurred in the first phase when the temperature associated with the image data acquired by the particular infrared camera of the first plurality of infrared cameras is greater than the temperature data associated with image data acquired by the infrared camera of the second plurality of infrared cameras for the same component part or connection of the second phase to the component part or connection of the first phase imaged by the particular infrared camera of the first plurality of infrared cameras. The processing unit is configured specifically to determine that a load imbalance has occurred when a temperature profile between the temperature associated with the image data acquired by the particular infrared camera of the first plurality of infrared cameras and the one or more temperatures associated with image data acquired by one or more other infrared cameras of the first plurality of infrared cameras is substantially the same as a temperature profile between the temperature data associated with the image data acquired by the infrared camera of the second plurality of infrared cameras for the same component part or connection of the second phase to the component part or connection of the first phase imaged by the particular infrared camera of the first plurality of infrared cameras and the one or more temperatures associated with the image data acquired by the one or more other infrared cameras of the second plurality of infrared cameras for the same one or more components and/or one or more connections of the second phase to the one or more components and/or one or more connections of the first phase imaged by the one or more other infrared cameras of the first plurality of infrared cameras.

According to an example, a third plurality of infrared cameras 26 is configured to acquired image data for a third phase 70 of the switchgear. The third phase comprises a plurality of component parts 72 comprising a circuit breaker and a plurality of busbars and the third phase comprises a plurality of connections 74 between the plurality of components. Each infrared camera of the third plurality of infrared cameras is configured to acquire image data for a component part of the plurality of component parts or a connection of the plurality of connections of the third phase. Each infrared camera of the third plurality of infrared cameras acquires different image data to the other infrared cameras of the third plurality of infrared cameras. The determination that the temperature associated with the image data acquired by the particular infrared camera of the first plurality of infrared cameras is associated with a fault or load imbalance comprises utilization of a temperature associated with image data acquired by an infrared camera of the third plurality of infrared cameras for the same component part or connection of the third phase to the component part or connection of the first phase imaged by the particular infrared camera of the first plurality of infrared cameras.

According to an example, the determination that the temperature associated with the image data acquired by the particular infrared camera of the first plurality of infrared cameras is associated with a fault or load imbalance comprises utilization of one or more temperatures associated with image data acquired by one or more other infrared cameras of the third plurality of infrared cameras for the same one or more components and/or one or more connections of the third phase to the one or more components and/or one or more connections of the first phase imaged by the one or more other infrared cameras of the first plurality of infrared cameras.

According to an example, the processing unit is configured to determine that a fault has occurred in the first phase with respect to the component part or connection imaged by the particular infrared camera of the first plurality of infrared cameras when the temperature associated with the image data acquired by the particular infrared camera of the first plurality of infrared cameras is greater than the temperature data associated with image data acquired by the infrared camera of the third plurality of infrared cameras for the same component part or connection of the third phase to the component part or connection of the first phase imaged by the particular infrared camera of the first plurality of infrared cameras. The processing unit is configured to specifically determine that a fault has occurred when a temperature profile between the temperature associated with the image data acquired by the particular infrared camera of the first plurality of infrared cameras and the one or more temperatures associated with image data acquired by one or more other infrared cameras of the first plurality of infrared cameras is substantially different to a temperature profile between the temperature data associated with the image data acquired by the infrared camera of the third plurality of infrared cameras for the same component part or connection of the third phase to the component part or connection of the first phase imaged by the particular infrared camera of the first plurality of infrared cameras and the one or more temperatures associated with the image data acquired by the one or more other infrared cameras of the third plurality of infrared cameras for the same one or more components and/or one or more connections of the third phase to the one or more components and/or one or more connections of the first phase imaged by the one or more other infrared cameras of the first plurality of infrared cameras.

According to an example, the processing unit is configured to determine that a load imbalance has occurred in the first phase when the temperature associated with the image data acquired by the particular infrared camera of the first plurality of infrared cameras is greater than the temperature data associated with image data acquired by the infrared camera of the third plurality of infrared cameras for the same component part or connection of the third phase to the component part or connection of the first phase imaged by the particular infrared camera of the first plurality of infrared cameras. The processing unit is configured to specifically determine that a load imbalance has occurred when a temperature profile between the temperature associated with the image data acquired by the particular infrared camera of the first plurality of infrared cameras and the one or more temperatures associated with image data acquired by one or more other infrared cameras of the first plurality of infrared cameras is substantially the same as a temperature profile between the temperature data associated with the image data acquired by the infrared camera of the third plurality of infrared cameras for the same component part or connection of the third phase to the component part or connection of the first phase imaged by the particular infrared camera of the first plurality of infrared cameras and the one or more temperatures associated with the image data acquired by the one or more other infrared cameras of the third plurality of infrared cameras for the same one or more components and/or one or more connections of the third phase to the one or more components and/or one or more connections of the first phase imaged by the one or more other infrared cameras of the first plurality of infrared cameras.

Figure 2:
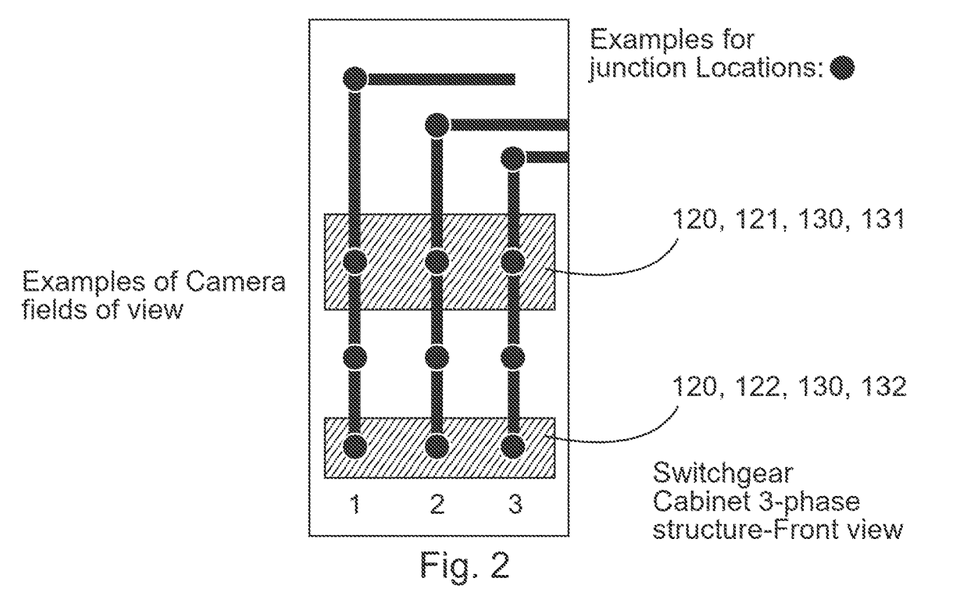
FIG. 2 and FIG. 3 show schematic representations of the components and connections of three phases in a switchgear compartment in accordance with the disclosure.

FIG. 2 shows a schematic representation of a switchgear cabinet with a 3 phase structure, shown from the front. The circular dots represent junction locations between the components of the phases. A number of infrared cameras 120 are viewing different connections and all components of the phases. One camera 122 with a field of view 132 is viewing the same connections for all of the 3 phases. Another camera 124 with a field of view 134 is viewing the same connections for all of the 3 phases, where these connections are different to the other connections. They can be multiple cameras viewing all parts of the phases of the switchgear.

Figure 3:
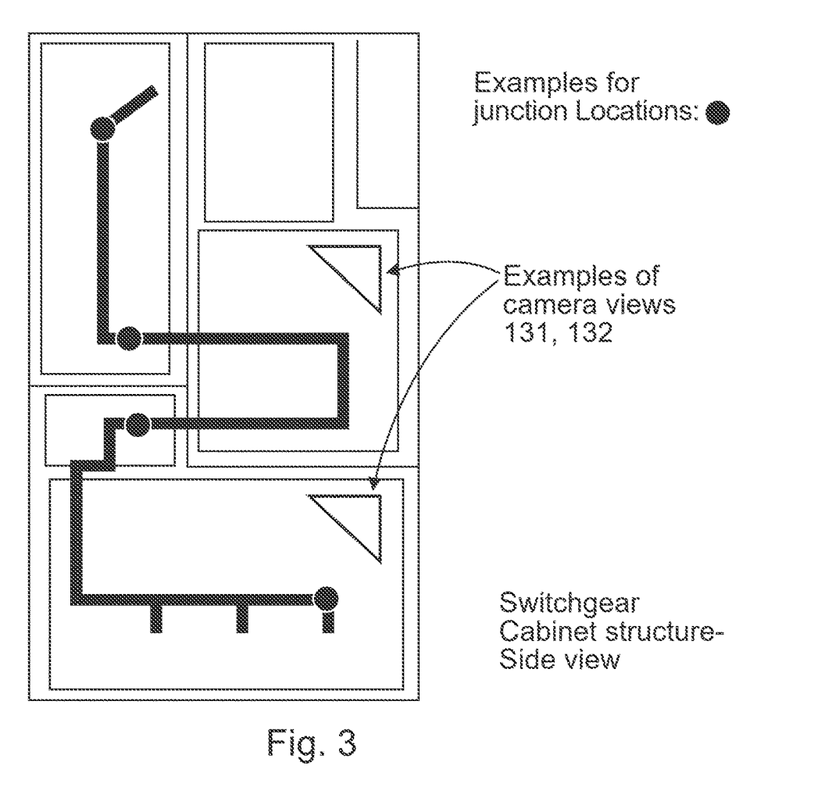

FIG. 3 shows a side view of the same switchgear compartment of FIG. 2, where only now one phase can be seen. In this particular example, the phase passes through a number of different compartment or cabinets. However, in each compartment a camera can be located that views all or several of the components and connections for all or a subset of the 3 phases within that compartment/cabinet.

Figure 4:
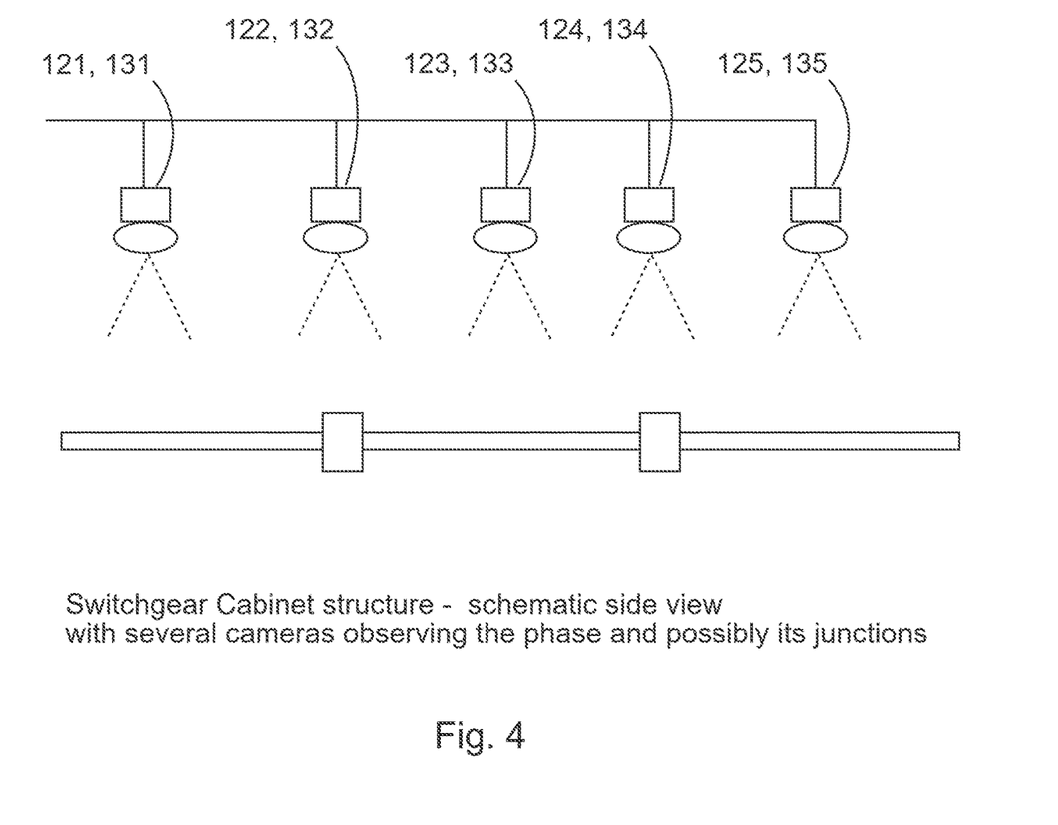
FIG. 4 shows a schematic representation of the components and connections of a phase in a switchgear compartment being monitored by multiple infrared cameras in accordance with the disclosure.

FIG. 4 shows different cameras, 121, 122, 123, 124, and 125 that are viewing sections of a phase within a switchgear. The same cameras may also have the other phases inside their field of view. It is to be noted that although only one phase is shown, there are three phases in the compartment and normally each camera observes the equivalent section of all three phases. However, dependent upon other requirements, two cameras can be used to observes the equivalent sections of all three phases or indeed three cameras can be utilized. The imagery from the two or more cameras observing the equivalent sections of the three phases can be analyzed together to determine if there is a fault or load imbalance, or the image from the single camera observing all three phases can be analyzed.

Thus, with respect to FIGS. 2-4 a system 11 for monitoring a switchgear 100 comprises multiple infrared cameras 120 with fields of view 30, a processing unit 30, and an output unit 40. The multiple infrared cameras are configured to acquire multiple image data of a plurality of phases 50, 60, 70 of the switchgear. Each phase comprises a plurality of component parts 52, 62, 72 comprising a circuit breaker and a plurality of busbars and/or cables or other conductive parts and wherein each phase comprises a plurality of connections 54 between the plurality of components. At least one infrared camera is configured to acquire image data of a same component part of the plurality of component parts of the plurality of phases and/or acquire image data of a same connection of the plurality of connections for of the plurality of phases, and each infrared camera acquires different image data to the other infrared cameras of the multiple infrared cameras. The processing unit is configured to determine that there is a phase imbalance in a specific phase comprising a determination from a plurality of image data that temperature information for a plurality of component parts and/or a plurality of connections for that specific phase has an overall enhanced temperature compared to the temperature information for the same plurality of component parts and/or the same plurality of connections for one or more other phases of the plurality of phases. The processing unit is configured to determine that there is a fault in a specific phase comprising a determination from a plurality of image data that temperature information for a first component part and/or a first connection for that specific phase has an enhanced temperature compared to the temperature information for the same first component part and/or the same first connection for one or more other phases of the plurality of phases and that temperature information for one or more second component parts and/or one or more second connections for that specific phase does not have an enhanced temperature compared to the temperature information for the same one or more second component parts and/or the same one or more second connections for one or more other phases of the plurality of phases. The output unit is configured to output information that a fault or load imbalance has occurred in a phase.

Thus the above described system addresses the problem of distinguishing between an overheating of one of the phases caused by load imbalance—which is mostly uncritical and may happen to a switchgear which is in a good state—and genuine faults, which are caused by locally enhanced resistances and bad contacts.

The solution involves the usage of several infrared cameras. These are installed in several compartments of the switchgear and oriented towards the conductive parts (bus bars, cables, breakers, junctions etc.). The system is applicable to all possible systems where several parallel conductors are used for electrical power transmission and/or distribution, AC or DC.

Each camera observes sections of a plurality of phases. Often, just one camera is installed per compartment, in such a way that it can determine the temperatures of all phases, e.g. in a 3-phase system.

In an example, each infrared camera is configured to acquire image data of a same component part of at least two phases and/or acquire image data of a same connection of at least two phases.

The system operates algorithmically: If temperature information from a phase shows an overall enhanced temperature (as compared to the other phases) it can be concluded that there is a phase imbalance. If only a localized strong heating is observed by one camera, but not by the other cameras observing the same phase, it can be concluded that there is a fault of the switchgear, e.g. a bad contact.

Thus, in the described system pictures or images from a number of IR cameras are taken and sent to a common processing unit. The locations of the busbars, connections, and other components of each phase on these IR pictures are known, and also for each busbar, connection or component it is known to which phase it belongs to. Also, if required knowledge of how far heat from a fault will travel along the busbars can be taken into account.

If a significant temperature difference between busbars is detected on one phase, the processing unit will evaluate if such a temperature difference (with the same phase(s) being hotter than the other(s)) is present on the other IR pictures of the same switchgear. If the result is that one or two whole phases are hotter throughout than the other(s), a low-priority warning of a probable current imbalance can be given. If, however, only some part of the conductors or some of the devices of one phase are hotter than its counterparts, a high-priority alarm is generated, to warn of a developing fault. Thus, a simple and effective way is provided to distinguish if there is a fault or load imbalance in a switchgear and an ability to distinguish between these two situations is provided.

The system enables that while load imbalance and faults may, under certain circumstances, be indistinguishable on the IR image of one part of the switchgear, joint analysis of several IR images from different parts of a switchgear can resolve this ambiguity, because the temperature difference from a fault will not spread great distance leading to local heating, whilst a current or load imbalance will affect the whole conductor leading to a global increase in temperature.

The inventors realized that the above described system could be developed because while heat can spread from a point fault through a certain length of conductor, some heat will dissipate to ambient air along the conductor. In particular across busbar connections and through the circuit breaker, not much heat will spread. Therefore, in case of a point fault, the inventors realised that elevated temperatures may be visible along all sections of busbar of the affected phase on one IR camera's field of view, but not or to a much lesser degree on busbars further away from the fault location, within the field of view of other IR cameras. Thus, use is made of a number of cameras observing different parts of the phases of a switchgear. In contrast, in case of load imbalance, the inventors realized that a temperature difference between busbars and components for the different phases would be observed throughout the switchgear, on all IR cameras. Therefore, cross-correlating data from multiple or all IR cameras could be used, with appropriate algorithms, to distinguish between local faults requiring intervention and load imbalances between conductors requiring no intervention. Here, reference to "algorithms" relates at one level to a simple comparison of temperatures and temperature profiles along points of the phases, as described above.

It is to be noted that, where it is described that each infrared camera of the multiple infrared cameras acquires different image data to the other infrared cameras of the multiple infrared cameras, does not mean that cameras cannot acquire overlapping image data. Thus, different cameras can acquire imagery of the same component part of one, two or more phases, but each camera is acquiring imagery that is not completely the same as that acquired by other cameras. Thus, each camera is acquiring at least some imagery that is not being acquired by another camera. Also, each camera has a field of view that can acquire imagery of the same part of several (one, two or three) of the phases. It can be possible e.g. that two cameras per compartment are installed each looking at one or two phases. The information of both cameras is then combined, so that the processing unit can process it as described.

Thus, there can be for example three phases, each having components parts that heat up as a consequence of Joule heating. These component parts are for example parts of a circuit breaker, busbars, cables, and connection. An infrared camera can then be used to determine a temperature of a specific component part or temperatures of component parts. If the three phases are operating without a fault and/or there is no load imbalance, then the same component(s) for all phases should be at an equivalent temperature(s). In an example, one camera can be used to image this same component part for all three phases from which a temperature of that component part, for all the phases, can be used to provide information as to whether there is a fault or phase imbalance in a phase. Also, rather than one camera being used to image the same component part of all the phases, one, two or three cameras can image these component parts, and the image data used together to determine the temperatures of these same component parts for the three phases to determine if there is a fault in a phase or a load imbalance. In an example, one camera can view the same component part for all three phases. In an example, one camera can view the same component part of two phases, and a second camera can view the same component part for a third phase. In an example, one camera can view the same component part for two phases, and a second camera can view the same component part for a third phase and also view at least partially the same component part for one of the phases that is also being viewed by the first camera. In an example, three different cameras can each image the same component part for one phase of the three phases, the imagery from which when combined or analyzed together enables the temperature of the same component part for all three phases to be compared.

Thus for example, there can be two infrared cameras and each observes two phases.

The system enables for example a specific component part of a phase to be determined to be hotter than the equivalent or corresponding component parts of other phases, whilst other component parts of that phase can have equivalent temperatures to the other component parts of the other phases. Thus, it can be determined that the first phase has a fault associated with the specific component part. However, if a proportion if not all of the component parts of the first phase have an elevated temperature above that for the corresponding component parts for the other phases, it can be determined that the first phase has a load imbalance.

Here, not having an enhanced temperature means that the temperatures of the component parts and or connections of the specific phase can be equivalent or substantially equivalent to the temperatures of the same parts/connections of the other phases.

It is also to be noted that reference to "a specific phase" refers to any of the phases.

In this manner, a number of infrared cameras are looking at different parts of phases, such as the circuit breaker and part of that circuit breaker, and busbars and connections between bus bars and the parts of the circuit breaker, and in this manner it can be determined if there is a fault such as loose screws or poor contacts or broken connections that is leading to localised heating, thereby requiring immediate remedial action to be undertaken, and it is also enabled to determine if that phase is suffering a load imbalance, where higher than ideal current flow is associated with the phase, which should be addressed but is not such a high priority problem as fault. Thus, not only can the system determine both of these situations of fault or load imbalance, the system is able to differentiate between the two issues.

In other words, each camera can observe one or more sections of at least one phase. Just one camera can if necessary be installed per compartment, or more than one camera can be installed per compartment. This can be done in such a way that the one or more cameras can determine the temperatures of all phases, e.g. in a 3-phase system. One or several cameras, in this sense, produce thermal images of corresponding parts of the three phases, e.g., in order to compare the values. If the camera resolution is sufficient, one camera can be used in order to optimize cost.

In an example, each infrared camera is configured to acquire image data of a same component part of at least two phases and/or acquire image data of a same connection of at least two phases.

Thus, each camera can observe sections of at least two phases.

In other words, each camera observes sections of at least two phases. For example in a compartmentalized arrangement just one camera can be installed per compartment, and in such a way that it can determine the temperatures of all phases, e.g. in a 3-phase system. Then, in essence in an algorithmic manner, if temperature information from a phase shows an overall enhanced temperature (as compared to the other phases) it can be concluded that there is a phase imbalance. If only a localized strong heating is observed by one camera, but not by the other cameras observing the same phase, it can be concluded that there is a fault of the switchgear, e.g. a bad contact.

In an aspect, there is provided a system for monitoring a switchgear, the system comprising: multiple infrared cameras; a processing unit; and an output unit.

A first plurality of infrared cameras is configured to acquire image data for a first phase of a switchgear. The first phase comprises a plurality of component parts comprising a circuit breaker and a plurality of busbars and the first phase comprises a plurality of connections between the plurality of components. Each infrared camera of the first plurality of infrared cameras is configured to acquire image data for a component part of the plurality of component parts or a connection of the plurality of connections. Each infrared camera of the first plurality of infrared cameras acquires different image data to the other infrared cameras of the first plurality of infrared cameras. The processing unit is configured to indicate that a fault or load imbalance has occurred in the first phase. The indication comprises a determination that a temperature associated with image data acquired by a particular infrared camera of the first plurality of infrared cameras is associated with a fault or load imbalance in the first phase. The determination comprises utilization of one or more temperatures associated with image data acquired by one or more other infrared cameras of the first plurality of infrared cameras. The output unit is configured to output information that a fault or load imbalance has occurred in the first phase.

It is to be noted that, where it is described that each infrared camera of the first plurality of infrared cameras acquires different image data to the other infrared cameras of the first plurality of infrared cameras, does not mean that cameras cannot acquire overlapping image data. Thus, different cameras can acquire imagery of the same component part, but each camera is acquiring imagery that is not completely the same as that acquired by other cameras. Thus each camera is acquiring at least some imagery that is not being acquired by another camera.

It is also to be noted that "infrared camera" refers to an infrared light camera configured to acquired infrared image data.

It is also to be noted that reference to "a particular infrared camera" refers to any of the first plurality of infrared cameras, and not to a specific one of those cameras. Thus, the above described system applies to any of the infrared cameras acquiring imagery for any component part or connection of the first phase.

In this manner, a number of infrared cameras are looking at different parts of a phase, such as the circuit breaker and part of that circuit breaker, and busbars and connections between bus bars and the parts of the circuit breaker. In this manner it can be determined if there is a fault such as loose screws or poor contacts or broken connections that is leading to localised heating, thereby requiring immediate remedial action to be undertaken. It is also enabled to determine if that phase is suffering a load imbalance, where higher than ideal current flow is associated with the phase, which should be addressed but is not such a high priority problem as fault. Thus, not only can the system determine both of these situations of fault or load imbalance, the system is able to differentiate between the two issues.

In an example, the output unit is configured to output information that a fault has occurred in the first phase with respect to the component part or connection imaged by the particular infrared camera of the first plurality of infrared cameras.

In an example, the determination that the temperature associated with the image data acquired by the particular infrared camera of the first plurality of infrared cameras is associated with a fault comprises a determination that the temperature associated with the image data acquired by the particular infrared camera is greater than an expected temperature. The expected temperature is determined comprising utilization of the one or more temperatures associated with the image data acquired by the one or more other infrared cameras of the first plurality of infrared cameras. It is to be noted that the camera can observe the other two phases in the compartment where it is installed, or a number of cameras can be used to observe all the phases.

The expected temperature calculation may also involve temperature measurement results from the other phases through the same camera or through other cameras.

In other words, the temperature determined from one camera looking at a particular part of the phase can be determined to be greater than anticipated with respect to the temperatures being determined from other parts of the phase, for example through comparison with a look up table of temperatures. To put it another way, it can be determined that there is a fault if one component part or connection is hotter than it should be with respect to other parts of the phase, enabling a fault to be determined and that the situation is not caused by load imbalance which would lead to overall heating of all components and connections of the phase.

In an example, a second plurality of infrared cameras is configured to acquired image data for a second phase of the switchgear. The second phase comprises a plurality of component parts comprising a circuit breaker and a plurality of busbars and the second phase comprises a plurality of connections between the plurality of components. Each infrared camera of the second plurality of infrared cameras is configured to acquire image data for a component part of the plurality of component parts or a connection of the plurality of connections of the second phase. Each infrared camera of the second plurality of infrared cameras acquires different image data to the other infrared cameras of the second plurality of infrared cameras. The determination that the temperature associated with the image data acquired by the particular infrared camera of the first plurality of infrared cameras is associated with a fault or load imbalance comprises utilization of a temperature associated with image data acquired by an infrared camera of the second plurality of infrared cameras for the same component part or connection of the second phase to the component part or connection of the first phase imaged by the particular infrared camera of the first plurality of infrared cameras.

It is to be noted that, where it is described that each infrared camera of the second plurality of infrared cameras acquires different image data to the other infrared cameras of the second plurality of infrared cameras, does not mean that cameras cannot acquire overlapping image data. Thus, different cameras can acquire imagery of the same component part, but each camera is acquiring imagery that is not completely the same as that acquired by other cameras. Thus each camera is acquiring at least some imagery that is not being acquired by another camera.

In an example, the determination that the temperature associated with the image data acquired by the particular infrared camera of the first plurality of infrared cameras is associated with a fault or load imbalance comprises utilization of one or more temperatures associated with image data acquired by one or more other infrared cameras of the second plurality of infrared cameras for the same one or more components and/or one or more connections of the second phase to the one or more components and/or one or more connections of the first phase imaged by the one or more other infrared cameras of the first plurality of infrared cameras.

Here, reference to the one or more "other" infrared cameras of the second plurality of infrared cameras means infrared cameras that are different to the infrared camera of the second plurality of infrared cameras that is acquiring image data for the same component or connection being imaged by the particular camera of the first plurality of infrared cameras.

In other words, a fault or load imbalance in one phase can be determined using information from different phase as a form of baseline. Thus, for example the same component parts and/or connections of each phase can exhibit the same or similar temperatures, whilst one part or connection of one phase can have an elevated temperature with respect to the same part or connection of a different phase, thereby indicating that there is a fault with respect to this part or connection of that phase. However, it can also be determined that all parts or connections of one phase have an elevated temperature with respect to the same parts or connections of a different phase, with generally the same temperature distribution between the phases, indicating that more current is flowing through one phase than the other phase, and other words that a load imbalance exists. Thus, immediate remedial action can be effected upon indication that a fault has occurred, and a notification can be made that there was a load imbalance, which although not ideal, does not require such immediate action is required for the fault.

In an example, the processing unit is configured to determine that a fault has occurred in the first phase with respect to the component part or connection imaged by the particular infrared camera of the first plurality of infrared cameras when the temperature associated with the image data acquired by the particular infrared camera of the first plurality of infrared cameras is greater than the temperature data associated with image data acquired by the infrared camera of the second plurality of infrared cameras for the same component part or connection of the second phase to the component part or connection of the first phase imaged by the particular infrared camera of the first plurality of infrared cameras. The processing unit is configured specifically determine that a fault has occurred when a temperature profile between the temperature associated with the image data acquired by the particular infrared camera of the first plurality of infrared cameras and the one or more temperatures associated with image data acquired by one or more other infrared cameras of the first plurality of infrared cameras is substantially different to a temperature profile between the temperature data associated with the image data acquired by the infrared camera of the second plurality of infrared cameras for the same component part or connection of the second phase to the component part or connection of the first phase imaged by the particular infrared camera of the first plurality of infrared cameras and the one or more temperatures associated with the image data acquired by the one or more other infrared cameras of the second plurality of infrared cameras for the same one or more components and/or one or more connections of the second phase to the one or more components and/or one or more connections of the first phase imaged by the one or more other infrared cameras of the first plurality of infrared cameras.

In an example, the processing unit is configured to determine that a load imbalance has occurred in the first phase when the temperature associated with the image data acquired by the particular infrared camera of the first plurality of infrared cameras is greater than the temperature data associated with image data acquired by the infrared camera of the second plurality of infrared cameras for the same component part or connection of the second phase to the component part or connection of the first phase imaged by the particular infrared camera of the first plurality of infrared cameras. The processing unit is configured specifically to determine that a load imbalance has occurred when a temperature profile between the temperature associated with the image data acquired by the particular infrared camera of the first plurality of infrared cameras and the one or more temperatures associated with image data acquired by one or more other infrared cameras of the first plurality of infrared cameras is substantially the same as a temperature profile between the temperature data associated with the image data acquired by the infrared camera of the second plurality of infrared cameras for the same component part or connection of the second phase to the component part or connection of the first phase imaged by the particular infrared camera of the first plurality of infrared cameras and the one or more temperatures associated with the image data acquired by the one or more other infrared cameras of the second plurality of infrared cameras for the same one or more components and/or one or more connections of the second phase to the one or more components and/or one or more connections of the first phase imaged by the one or more other infrared cameras of the first plurality of infrared cameras.

In an example, a third plurality of infrared cameras is configured to acquired image data for a third phase of the switchgear. The third phase comprises a plurality of component parts comprising a circuit breaker and a plurality of busbars and the third phase comprises a plurality of connections between the plurality of components. Each infrared camera of the third plurality of infrared cameras is configured to acquire image data for a component part of the plurality of component parts or a connection of the plurality of connections of the third phase. Each infrared camera of the third plurality of infrared cameras acquires different image data to the other infrared cameras of the third plurality of infrared cameras. The determination that the temperature associated with the image data acquired by the particular infrared camera of the first plurality of infrared cameras is associated with a fault or load imbalance comprises utilization of a temperature associated with image data acquired by an infrared camera of the third plurality of infrared cameras for the same component part or connection of the third phase to the component part or connection of the first phase imaged by the particular infrared camera of the first plurality of infrared cameras.

It is to be noted that, where it is described that each infrared camera of the third plurality of infrared cameras acquires different image data to the other infrared cameras of the third plurality of infrared cameras, does not mean that cameras cannot acquire overlapping image data. Thus, different cameras can acquire imagery of the same component part, but each camera is acquiring imagery that is not completely the same as that acquired by other cameras. Thus each camera is acquiring at least some imagery that is not being acquired by another camera.

In an example, the determination that the temperature associated with the image data acquired by the particular infrared camera of the first plurality of infrared cameras is associated with a fault or load imbalance comprises utilization of one or more temperatures associated with image data acquired by one or more other infrared cameras of the third plurality of infrared cameras for the same one or more components and/or one or more connections of the third phase to the one or more components and/or one or more connections of the first phase imaged by the one or more other infrared cameras of the first plurality of infrared cameras.

Here, reference to the one or more "other" infrared cameras of the third plurality of infrared cameras means infrared cameras that are different to the infrared camera of the third plurality of infrared cameras that is acquiring image data for the same component or connection being imaged by the particular camera of the first plurality of infrared cameras.

In an example, the processing unit is configured to determine that a fault has occurred in the first phase with respect to the component part or connection imaged by the particular infrared camera of the first plurality of infrared cameras when the temperature associated with the image data acquired by the particular infrared camera of the first plurality of infrared cameras is greater than the temperature data associated with image data acquired by the infrared camera of the third plurality of infrared cameras for the same component part or connection of the third phase to the component part or connection of the first phase imaged by the particular infrared camera of the first plurality of infrared cameras. The processing unit is configured to specifically determine that a fault has occurred when a temperature profile between the temperature associated with the image data acquired by the particular infrared camera of the first plurality of infrared cameras and the one or more temperatures associated with image data acquired by one or more other infrared cameras of the first plurality of infrared cameras is substantially different to a temperature profile between the temperature data associated with the image data acquired by the infrared camera of the third plurality of infrared cameras for the same component part or connection of the third phase to the component part or connection of the first phase imaged by the particular infrared camera of the first plurality of infrared cameras and the one or more temperatures associated with the image data acquired by the one or more other infrared cameras of the third plurality of infrared cameras for the same one or more components and/or one or more connections of the third phase to the one or more components and/or one or more connections of the first phase imaged by the one or more other infrared cameras of the first plurality of infrared cameras.

In an example, the processing unit is configured to determine that a load imbalance has occurred in the first phase when the temperature associated with the image data acquired by the particular infrared camera of the first plurality of infrared cameras is greater than the temperature data associated with image data acquired by the infrared camera of the third plurality of infrared cameras for the same component part or connection of the third phase to the component part or connection of the first phase imaged by the particular infrared camera of the first plurality of infrared cameras. The processing unit is configured to specifically determine that a load imbalance has occurred when a temperature profile between the temperature associated with the image data acquired by the particular infrared camera of the first plurality of infrared cameras and the one or more temperatures associated with image data acquired by one or more other infrared cameras of the first plurality of infrared cameras is substantially the same as a temperature profile between the temperature data associated with the image data acquired by the infrared camera of the third plurality of infrared cameras for the same component part or connection of the third phase to the component part or connection of the first phase imaged by the particular infrared camera of the first plurality of infrared cameras and the one or more temperatures associated with the image data acquired by the one or more other infrared cameras of the third plurality of infrared cameras for the same one or more components and/or one or more connections of the third phase to the one or more components and/or one or more connections of the first phase imaged by the one or more other infrared cameras of the first plurality of infrared cameras.

Thus, by using information from all three phases, it can be determined based on statistical information that a fault or load imbalance exists. Thus, a particular part or connection of one phase can have a temperature greater than the temperature of the same part or connection of the other two phases, which could have similar temperatures, whilst other parts or connections of the first phase can have the same temperatures as those parts connections of the other two phases, thereby indicating that there is a fault in that part or connection of the first phase. However, if all parts or connections of the first phase are at an elevated temperature with respect to the same parts or connections of the other two phases, which have similar temperatures, then it can be determined that there was a load imbalance with an elevated current flowing through the first phase.

In a an aspect, there is provided a switchgear comprising a system according to one of the aspects described above.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for monitoring a switchgear, comprising:
multiple infrared cameras with fields of view;
a processing unit; and
an output unit;
wherein the multiple infrared cameras are configured to acquire multiple image data of a plurality of phases of the switchgear, wherein each phase comprises a plurality of component parts comprising a circuit breaker and a plurality of busbars and/or cables and wherein each phase comprises a plurality of connections between the plurality of components;
wherein at least one infrared camera of the multiple infrared cameras is configured to acquire image data of a same component part of the plurality of component parts of the plurality of phases and/or acquire image data of a same connection of the plurality of connections of the plurality of phases, and wherein each infrared camera acquires different image data to the other infrared cameras of the multiple infrared cameras;
wherein the processing unit is configured to determine that there is a phase imbalance in a specific phase comprising a determination from a plurality of image data that temperature information for a plurality of component parts and/or a plurality of connections for that specific phase has an overall enhanced temperature compared to the temperature information for the same plurality of component parts and/or the same plurality of connections for one or more other phases of the plurality of phases;

wherein the processing unit is configured to determine that there is a fault in a specific phase comprising a determination from a plurality of image data that temperature information for a first component part and/or a first connection for that specific phase has an enhanced temperature compared to the temperature information for the same first component part and/or the same first connection for one or more other phases of the plurality of phases and that temperature information for one or more second component parts and/or one or more second connections for that specific phase does not have an enhanced temperature compared to the temperature information for the same one or more second component parts and/or the same one or more second connections for one or more other phases of the plurality of phases; and wherein, the output unit is configured to output information that a fault or load imbalance has occurred in a phase.

2. The system according to claim 1, wherein each infrared camera is configured to acquire image data of a same component part of at least two phases and/or acquire image data of a same connection of at least two phases.

3. The system according to claim 1, comprising three phases.

4. A system for monitoring a switchgear, the system comprising:

multiple infrared cameras;

a processing unit; and an output unit;

wherein, a first plurality of infrared cameras is configured to acquired image data for a first phase of a switchgear, wherein the first phase comprises a plurality of component parts comprising a circuit breaker and a plurality of busbars and the first phase comprises a plurality of connections between the plurality of components, wherein each infrared camera of the first plurality of infrared cameras is configured to acquire image data for a component part of the plurality of component parts or a connection of the plurality of connections, and wherein each infrared camera of the first plurality of infrared cameras acquires different image data to the other infrared cameras of the first plurality of infrared cameras, a second plurality of infrared cameras is configured to acquired image data for a second phase of the switchgear, wherein the second phase comprises a plurality of component parts comprising a circuit breaker and a plurality of busbars and the second phase comprises a plurality of connections between the plurality of components, wherein each infrared camera of the second plurality of infrared cameras is configured to acquire image data for a component part of the plurality of component parts or a connection of the plurality of connections of the second phase, and wherein each infrared camera of the second plurality of infrared cameras acquires different image data to the other infrared cameras of the second plurality of infrared cameras, wherein, the processing unit is configured to indicate that a fault or load imbalance has occurred in the first phase, the indication comprising a determination that a temperature associated with image data acquired by a particular infrared camera of the first plurality of infrared cameras is associated with a fault or load imbalance in the first phase, wherein the determination comprises utilization of one or more temperatures associated with image data acquired by one or more other infrared cameras of the first plurality of infrared cameras and utilization of a temperature associated with image data acquired by an infrared camera of the second plurality of infrared cameras for the same component part or connection of the second phase to the component part or connection of the first phase imaged by the particular infrared camera of the first plurality of infrared cameras, and wherein, the output unit is configured to output information that a fault or load imbalance has occurred in the first phase.

5. The system according to claim 4, the output unit is configured to output information that a fault has occurred in the first phase with respect to the component part or connection imaged by the particular infrared camera of the first plurality of infrared cameras.

6. The system according to claim 4, wherein the determination that the temperature associated with the image data acquired by the particular infrared camera of the first plurality of infrared cameras is associated with a fault comprises a determination that the temperature associated with the image data acquired by the particular infrared camera is greater than an expected temperature, wherein the expected temperature is determined comprising utilization of the one or more temperatures associated with the image data acquired by the one or more other infrared cameras of the first plurality of infrared cameras.

7. The system according to claim 4, wherein the determination that the temperature associated with the image data acquired by the particular infrared camera of the first plurality of infrared cameras is associated with a fault or load imbalance comprises utilization of one or more temperatures associated with image data acquired by one or more other infrared cameras of the second plurality of infrared cameras for the same one or more components and/or one or more connections of the second phase to the one or more components and/or one or more connections of the first phase imaged by the one or more other infrared cameras of the first plurality of infrared cameras.

8. The system according to claim 4, wherein the processing unit is configured to determine that a fault has occurred in the first phase with respect to the component part or connection imaged by the particular infrared camera of the first plurality of infrared cameras when the temperature associated with the image data acquired by the particular infrared camera of the first plurality of infrared cameras is greater than the temperature data associated with image data acquired by the infrared camera of the second plurality of infrared cameras for the same component part or connection of the second phase to the component part or connection of the first phase imaged by the particular infrared camera of the first plurality of infrared cameras, and a temperature profile between the temperature associated with the image data acquired by the particular infrared camera of the first plurality of infrared cameras and the one or more temperatures associated with image data acquired by one or more other infrared cameras of the first plurality of infrared cameras is substantially different to a temperature profile between the temperature data associated with the image data acquired by the infrared camera of the second plurality of infrared cameras for the same component part or connection of the second phase to the component part or connection of the first phase imaged by the particular infrared camera of the first plurality of infrared cameras and the one or more temperatures associated with the image data acquired by the one or more other infrared cameras of the second plurality of infrared cameras for the same one or more components and/or one or more connections of the second phase to the one or more components and/or one or more connections of the first phase imaged by the one or more other infrared cameras of the first plurality of infrared cameras.

9. The system according to claim 4, wherein the processing unit is configured to determine that a load imbalance has occurred in the first phase when the temperature associated with the image data acquired by the particular infrared camera of the first plurality of infrared cameras is greater than the temperature data associated with image data acquired by the infrared camera of the second plurality of infrared cameras for the same component part or connection of the second phase to the component part or connection of the first phase imaged by the particular infrared camera of the first plurality of infrared cameras, and a temperature profile between the temperature associated with the image data acquired by the particular infrared camera of the first plurality of infrared cameras and the one or more temperatures associated with image data acquired by one or more other infrared cameras of the first plurality of infrared cameras is substantially the same as a temperature profile between the temperature data associated with the image data acquired by the infrared camera of the second plurality of infrared cameras for the same component part or connection of the second phase to the component part or connection of the first phase imaged by the particular infrared camera of the first plurality of infrared cameras and the one or more temperatures associated with the image data acquired by the one or more other infrared cameras of the second plurality of infrared cameras for the same one or more components and/or one or more connections of the second phase to the one or more components and/or one or more connections of the first phase imaged by the one or more other infrared cameras of the first plurality of infrared cameras.

10. The system according to claim 4, wherein, a third plurality of infrared cameras is configured to acquired image data for a third phase of the switchgear, wherein the third phase comprises a plurality of component parts comprising a circuit breaker and a plurality of busbars and the third phase comprises a plurality of connections between the plurality of components, wherein each infrared camera of the third plurality of infrared cameras is configured to acquire image data for a component part of the plurality of component parts or a connection of the plurality of connections of the third phase, and wherein each infrared camera of the third plurality of infrared cameras acquires different image data to the other infrared cameras of the third plurality of infrared cameras, and wherein the determination that the temperature associated with the image data acquired by the particular infrared camera of the first plurality of infrared cameras is associated with a fault or load imbalance comprises utilization of a temperature associated with image data acquired by an infrared camera of the third plurality of infrared cameras for the same component part or connection of the third phase to the component part or connection of the first phase imaged by the particular infrared camera of the first plurality of infrared cameras.

11. The system according to claim 10, wherein the determination that the temperature associated with the image data acquired by the particular infrared camera of the first plurality of infrared cameras is associated with a fault or load imbalance comprises utilization of one or more temperatures associated with image data acquired by one or more other infrared cameras of the third plurality of infrared cameras for the same one or more components and/or one or more connections of the third phase to the one or more components and/or one or more connections of the first phase imaged by the one or more other infrared cameras of the first plurality of infrared cameras.

12. The system according to claim 10, wherein the processing unit is configured to determine that a fault has occurred in the first phase with respect to the component part or connection imaged by the particular infrared camera of the first plurality of infrared cameras when the temperature associated with the image data acquired by the particular infrared camera of the first plurality of infrared cameras is greater than the temperature data associated with image data acquired by the infrared camera of the third plurality of infrared cameras for the same component part or connection of the third phase to the component part or connection of the first phase imaged by the particular infrared camera of the first plurality of infrared cameras, and a temperature profile between the temperature associated with the image data acquired by the particular infrared camera of the first plurality of infrared cameras and the one or more temperatures associated with image data acquired by one or more other infrared cameras of the first plurality of infrared cameras is substantially different to a temperature profile between the temperature data associated with the image data acquired by the infrared camera of the third plurality of infrared cameras for the same component part or connection of the third phase to the component part or connection of the first phase imaged by the particular infrared camera of the first plurality of infrared cameras and the one or more temperatures associated with the image data acquired by the one or more other infrared cameras of the third plurality of infrared cameras for the same one or more components and/or one or more connections of the third phase to the one or more components and/or one or more connections of the first phase imaged by the one or more other infrared cameras of the first plurality of infrared cameras.

13. The system according to claim 10, wherein the processing unit is configured to determine that a load imbalance has occurred in the first phase when the temperature associated with the image data acquired by the particular infrared camera of the first plurality of infrared cameras is greater than the temperature data associated with image data acquired by the infrared camera of the third plurality of infrared cameras for the same component part or connection of the third phase to the component part or connection of the first phase imaged by the particular infrared camera of the first plurality of infrared cameras, and a temperature profile between the temperature associated with the image data acquired by the particular infrared camera of the first plurality of infrared cameras and the one or more temperatures associated with image data acquired by one or more other infrared cameras of the first plurality of infrared cameras is substantially the same as a temperature profile between the temperature data associated with the image data acquired by the infrared camera of the third plurality of infrared cameras for the same component part or connection of the third phase to the component part or connection of the first phase imaged by the particular infrared camera of the first plurality of infrared cameras and the one or more temperatures associated with the image data acquired by the one or more other infrared cameras of the third plurality of infrared cameras for the same one or more components and/or one or more connections of the third phase to the one or more components and/or one or more connections of the first phase imaged by the one or more other infrared cameras of the first plurality of infrared cameras.

14. A system for monitoring a switchgear, the system comprising:
multiple infrared cameras;
a processing unit; and
an output unit;
wherein, a first plurality of infrared cameras is configured to acquired image data for a first phase of a switchgear, wherein the first phase comprises a plurality of component parts comprising a circuit breaker and a plurality of busbars and the first phase comprises a plurality of connections between the plurality of components, wherein each infrared camera of the first plurality of infrared cameras is configured to acquire image data for a component part of the plurality of component parts or a connection of the plurality of connections, and wherein each infrared camera of the first plurality of infrared cameras acquires different image data to the other infrared cameras of the first plurality of infrared cameras,
wherein, the processing unit is configured to indicate that a fault or load imbalance has occurred in the first phase, the indication comprising a determination that a temperature associated with image data acquired by a particular infrared camera of the first plurality of infrared cameras is associated with a fault or load imbalance in the first phase, wherein the determination comprises utilization of one or more temperatures associated with image data acquired by one or more other infrared cameras of the first plurality of infrared cameras, and
wherein, the output unit is configured to output information that a fault or load imbalance has occurred in the first phase.

* * * * *